Figure 1:
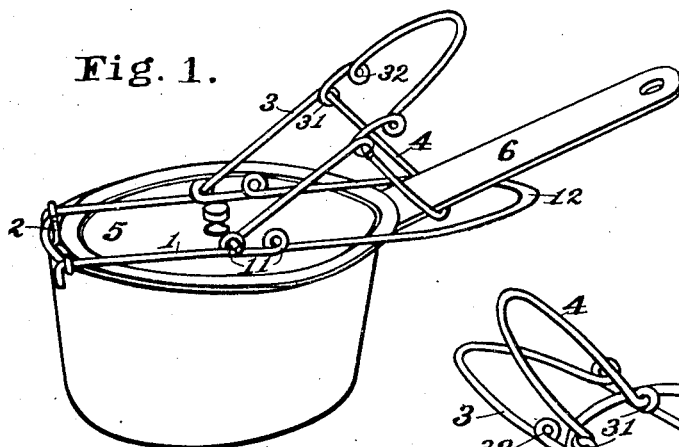

No. 892,404. PATENTED JULY 7, 1908.
H. L. CLARK.
KITCHEN UTENSIL.
APPLICATION FILED MAY 2, 1906.

WITNESSES. INVENTOR
Stanley H. Bissell Horace L. Clark
A. Kirkwood Armstrong BY A. Armstrong
ATTORNEY

UNITED STATES PATENT OFFICE.

HORACE L. CLARK, OF SEATTLE, WASHINGTON, ASSIGNOR TO AUGUSTUS ARMSTRONG, OF SEATTLE, WASHINGTON.

KITCHEN UTENSIL.

No. 892,404.     Specification of Letters Patent.     Patented July 7, 1908.

Application filed May 2, 1906. Serial No. 314,850.

*To all whom it may concern:*

Be it known that I, HORACE L. CLARK, a citizen of the United States, residing at Seattle, in the county of King and State of Washington, have invented a new and useful Kitchen Utensil, of which the following is a specification.

My invention relates to an improvement in kitchen utensils and comprises the parts and combinations of parts hereinafter particularly defined in the claims.

The object of my invention is to produce a device which will assist in handling ordinary kitchen appliances, particularly when hot, in such uses for instance, as holding covers upon pots and kettles while draining liquids therefrom, handling hot plates, pie-tins and dishes generally.

In the drawings accompanying herewith I have shown my invention embodied in the form now preferred by me.

Figure 2:
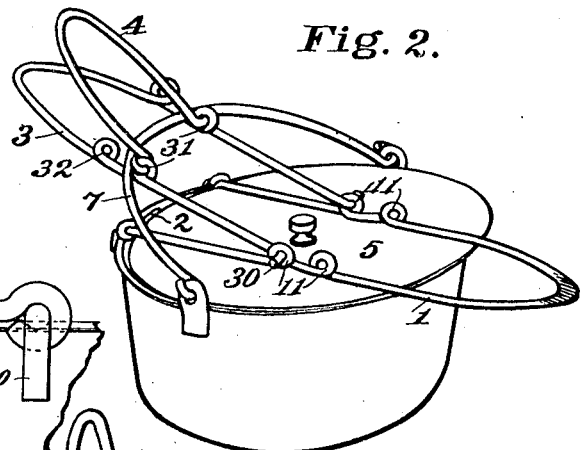
Figure 6:
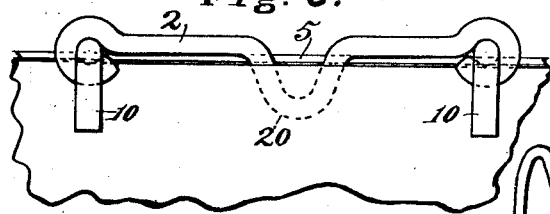
Figure 3:
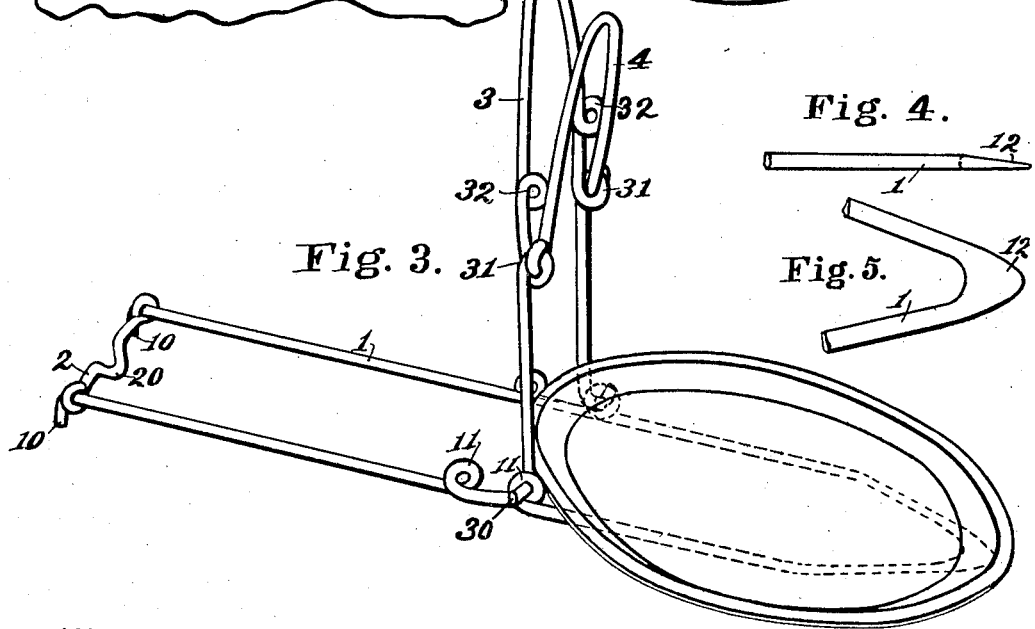
Figure 4:
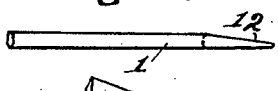
Figure 5:
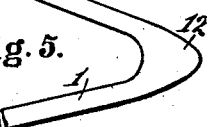

Figure 1 shows, in perspective, my device in use for draining liquids from a kettle having a side handle. Fig. 2 shows, in perspective, my device similarly used with a kettle having a bail. Fig. 3 shows the device in use for handling plates or other similar articles when hot. Figs. 4 and 5 are detail views showing the construction of the pointed end. Fig. 6 shows in elevation the end of the device in place on a kettle.

I have shown my invention as made from wire, this being deemed the most convenient and cheapest material. It may, however, be made of other material and in other forms if desired.

The foundation of the device consists of a frame 1 in general of rectangular outline. The wire forming this frame starts at one end of the frame and extends to the other end of the frame where it is inclined inwards and bent backward to form a somewhat pointed outline. It thence extends backwards to a point opposite the other end. Both ends of this wire are bent downwards to form spurs or projections 10, and these ends are connected by a bar 2, consisting of a piece of wire clamped about the wire of the frame 1 close inside the spurs 10.

The frame 1 has eyes 11 formed therein near the middle of its length, which form pivot bearings for a bail or lever 3. This bail is formed of wire bent upon itself and having its ends bent outward to form pivot pins 30, adapted to enter the eyes 11, two sets of which are shown, thus enabling the bail to be attached at two different positions. The bail should preferably have sufficient spring to hold it securely in place but to permit its being readily removed from one set of eyes and placed in the other. It will be found that such shifting of the point of pivoting on the frame 1 will better adapt the device to fit pans and kettles of different sizes. The bail 3 also has sets of eyes 31 and 32 formed therein near the middle of its length for the purpose of engaging the pot bail as a fulcrum and in one of these, the eyes 31, is pivoted an auxiliary bail 4.

The bar 2 connecting the ends of the wire forming the main frame 1, is bent downward sharply near the middle of its length to form a spur or offset 20. In use this is designed to go within the pot or stew pan and without the cover 5, while the spurs 10 are outside the pot or pan, as is clearly shown in Figs. 1, 2 and 6. This holds the cover 5 back a slight distance, which will permit the discharge of the liquid while holding back the solids. The opposite end of the main frame 1 comes to a point which is preferably flattened, after the manner shown in Figs. 4 and 5, so that it may be easily slid under pie-tins, plates and similar dishes.

One use for my device is shown in Fig. 1, in which it is used for holding the cover upon a handled stew-pan or pot so as to retain the solids while permitting pouring off of the liquids. The spurs 10 are outside the pan, the spur 20 is within the pan and outside the cover, and the bail 4 is beneath the handle 6. The end of the handle 6 is held with one hand and the upper end of the bail 3 with the other. Pressure applied to the bail 3 in a direction away from the handle 6, will hold the cover securely upon the pan but displaced laterally enough to permit free discharge of the liquids but not enough to permit escape of the solids.

In using the device upon a kettle or pot having a bail, as shown in Fig. 2, the bail 7 of the kettle may be thrown over the auxiliary bail 4 and this grasped with the bail 3 so as to hold the two together with the kettle bail between them. The bail 7 may rest either upon the eyes 31 forming the pivot for the bail 4, or upon the other set of eyes 32 as desired. The choice in this matter will be determined by the length of the kettle bail and which place it will best perform its function.

In using the device for handling hot dishes, such as plates, pudding dishes, etc., it is held in the position shown in Fig. 3, one hand grasping the end of the bail 3 and the other the square end of the frame 1. The point 12 being flattened may be easily slid under such an article, while the breadth of the frame 1 is sufficient to form a stable support. In this way such dishes may be handled easily when hot and without danger of burning the hands. My device will be found of great utility and convenience about a kitchen in many ways not herein mentioned.

While I have described the construction of the device in detail as shown, I am aware that these details may be widely varied. I do not therefore wish to be confined to the exact construction shown and described, but to claim the device, whatever the construction, so long as it comes within the terms of the claims in which my invention is defined.

What I claim is:

1. A kitchen utensil comprising a frame adapted to extend across the top of a pot or kettle and provided with means for engaging an edge of the pot, a bail or lever and means whereby it may be removably pivoted to said frame at a plurality of points, said bail or lever having fixed projections adapted to engage the pot bail as a fulcrum to thereby hold the pot cover securely in place.

2. A kitchen utensil comprising a frame adapted to extend across the top of a pot or kettle and having projections at one end adapted to engage the edge of the pot and another projection between the others and adapted to engage the edge of the pot cover to hold it slightly displaced, a bail or lever pivotally connected with said frame at an intermediate point and adapted to be fulcrumed upon the pot-bail to thereby hold the frame securely in position.

3. A kitchen utensil comprising a frame adapted to extend across the top of a pot or kettle and provided with the halves of a plurality of pivot connections in its central portion, a bail or lever provided with the complementary halves of said pivot connections, said pivot connections permitting disengagement and shifting of the pivot point, and means for engaging said bail or lever with the pot-bail acting as a fulcrum, whereby the frame may be held upon the kettle top.

4. A kitchen utensil comprising a frame adapted to extend across the top of a pot or kettle and provided at one end with projections adapted to engage respectively with the edge of the pot and with the pot cover, said frame having a plurality of pairs of pivot eyes at central points, a bail-like member having pivot pins at an end adapted to enter said eyes of the frame and to be held therein by the spring of the bail, and an auxiliary bail pivoted to and swinging freely from the central portion of the other bail-like member.

5. A kitchen utensil comprising a wire frame lying essentially in a plane and having two separated longitudinal wire-members which are turned down at one end, a bar connecting this end of said members and having a downward extension at its middle, and a bail hinged to said frame and provided with means whereby it may be fulcrumed upon the pot bail to thereby hold the pot cover securely down.

6. A kitchen utensil comprising a wire frame bent upon itself and having its ends bent laterally to form short projections, a wire secured to said ends adjacent to said projections and having a central lateral offset in the same direction as said projections, said frame having pivot eyes in its central part, a bail having laterally projecting ends adapted to enter said eyes and an auxiliary bail pivoted to the central portion of the main bail and adapted to engage the pot bail.

In testimony whereof I affix my signature in the presence of two witnesses.

HORACE L. CLARK.

Witnesses:
 ALFRED E. HODGSON,
 A. KIRKWOOD ARMSTRONG.